(12) United States Patent
MacDonald

(10) Patent No.: US 9,010,078 B2
(45) Date of Patent: Apr. 21, 2015

(54) WEED TRIMMER WITH A WINGNUT PLATE

(76) Inventor: Randy MacDonald, Miramichi Bay (CA)

(*) Notice: Subject to any disclaimer, the term of this patent is extended or adjusted under 35 U.S.C. 154(b) by 298 days.

(21) Appl. No.: 13/507,953

(22) Filed: Aug. 9, 2012

(65) Prior Publication Data

US 2014/0041353 A1 Feb. 13, 2014

(51) Int. Cl.
- A01D 34/00 (2006.01)
- A01D 34/73 (2006.01)
- A01D 34/84 (2006.01)

(52) U.S. Cl.
CPC .............. *A01D 34/733* (2013.01); *A01D 34/84* (2013.01)

(58) Field of Classification Search
USPC .................................. 56/12.7; 30/276, DIG. 5
See application file for complete search history.

(56) References Cited

U.S. PATENT DOCUMENTS

| | | | |
|---|---|---|---|
| 3,668,845 A | 6/1972 | Parker | |
| 3,782,085 A | 1/1974 | Parker et al. | |
| 4,152,882 A | 5/1979 | Howard | |
| 4,236,309 A * | 12/1980 | Cayou | 30/276 |
| 4,259,782 A * | 4/1981 | Proulx | 30/276 |
| 4,551,967 A | 11/1985 | Murcko | |
| D304,728 S | 11/1989 | Piorkowski | |
| 4,896,488 A | 1/1990 | Duncan et al. | |
| 4,942,664 A * | 7/1990 | Zatulovsky | 30/276 |
| D311,009 S | 10/1990 | Wilkins | |
| 5,167,108 A | 12/1992 | Bird | |
| 5,226,284 A | 7/1993 | Meehleder | |
| D359,291 S | 6/1995 | Tihonovich | |
| 5,617,636 A * | 4/1997 | Taggett et al. | 30/276 |
| 5,722,172 A * | 3/1998 | Walden | 30/347 |
| 5,836,227 A * | 11/1998 | Dees et al. | 30/276 |
| 5,845,405 A * | 12/1998 | Rosdahl | 30/276 |
| 5,966,914 A | 10/1999 | Reents | |
| 6,052,907 A * | 4/2000 | Wang | 30/276 |
| 6,112,416 A * | 9/2000 | Bridges et al. | 30/276 |
| 6,119,350 A | 9/2000 | Sutliff et al. | |
| 6,817,102 B2 * | 11/2004 | Harris et al. | 30/276 |
| 6,892,518 B1 * | 5/2005 | Bares | 56/12.7 |
| 7,028,455 B1 | 4/2006 | Liguras | |
| 7,614,153 B2 | 11/2009 | Guerra | |
| 7,878,097 B2 | 2/2011 | Strader | |
| 2002/0029483 A1 * | 3/2002 | Price | 30/276 |
| 2011/0232109 A1 | 9/2011 | Strader | |

FOREIGN PATENT DOCUMENTS

| | | |
|---|---|---|
| CA | 2002351 | 5/1991 |
| CA | 2654671 | 8/2009 |

* cited by examiner

*Primary Examiner* — Thomas B Will
*Assistant Examiner* — Mai Nguyen
(74) *Attorney, Agent, or Firm* — Mario Theriault

(57) ABSTRACT

The weed trimmer head is comprised of a sole plate having a diameter; a circumference; a plurality of pivot pins extending upwardly therefrom near the circumference. The sole plate also has a driving shaft extending upwardly therefrom from a center thereof. The driving shaft has a threaded segment thereon. A plurality of cutting blades are pivotally mounted to the plurality of pivot pins. A wingnut plate is also provided. This wingnut plate has a disc-like portion and wing blades extending on an upper side thereof. The wingnut plate has a threaded hole in its disc-like portion. The threaded hole is mounted to the threaded segment of the driving shaft and the wingnut plate is movable along the threaded segment, for selectively contacting or exposing the ends of the pivot pins.

20 Claims, 3 Drawing Sheets

US 9,010,078 B2

WEED TRIMMER WITH A WINGNUT PLATE

FIELD OF THE INVENTION

This invention pertains to tractor-mounted weed trimmers, and more particularly, it pertains to a weed trimmer in which the cutting blades are replaceable by working a wingnut plate mounted above the blades.

BACKGROUND OF THE INVENTION

Walk-behind lawnmowers with weed trimmer attachments have been known for some time. These weed trimmers are convenient for cutting grass and weeds along a fence for example. These weed trimmers are usually mounted to the forward corner of a lawnmower where they can be easily seen and guided by the user of the lawnmower. A weed trimmer mounted to a lawnmower is considered to be a very useful tool.

Examples of the weed trimmers mounted on walk-behind lawnmowers have been found in the prior art and are listed herein below to show the work of others in this field and the evolution of this technology:

U.S. Pat. No. 3,668,845 issued to James M. Parker on Jun. 13, 1972;
U.S. Pat. No. 3,782,085 issued to James M. Parker et al., on Jan. 1, 1974;
U.S. Pat. No. 4,152,882 issued to Tyson W. Howard on May 8, 1979;
U.S. Pat. No. 4,551,967 issued to Joseph S. Murcko on Nov. 12, 1985;
CA Patent Appl. 2,002,351 issued to Glenn W. Gregory on Nov. 2, 1989;
U.S. Des. Pat 304,728 issued to Peter V. Piorkowski on Nov. 21, 1989;
U.S. Pat. No. 4,896,488 issued to Larry A. Duncan et al. on Jan. 30, 1990;
U.S. Des. Pat. 311,009 issued to Robert W. Wilkins on Oct. 2, 1990;
U.S. Pat. No. 5,226,284 issued to John. C. Meehleder et al. on Jul. 13, 1993;
U.S. Des. Pat. 359,291 issued to Albert J. Tihonovich on Jun. 13, 1995;
U.S. Pat. No. 5,966,914 issued to Thomas R. Reents on Oct. 19, 1999.

The weed trimmers described in the above documents are mounted to walk-behind lawnmowers. When a cutting blade on the weed trimmer needs to the replaced, it is relatively easy to tilt the lawnmower on its side; take the weed trimmer head apart and to change the tines or the cutting blades that are worn out.

Because of the way cutting blades are retained to a weed trimmer head, it will be appreciated that the maintenance and repair of a weed trimmer attachment becomes a challenge when it is permanently mounted to a lawn tractor. A lawn tractor is relatively heavy and stable on the ground. It is impractical to tilt a lawn tractor on its side to replace worn cutting blades on a weed trimmer attachment. For that reason, basically, very few weed trimmer attachments exist for mounting to a lawn tractor.

In spite of the above-mentioned inconveniences, the prior art includes at least two examples of a weed trimmer mounted to a lawn tractor: U.S. Pat. No. 5,167,108 issued to Joseph J. Bird on Dec. 1, 1992. This document describes a weed trimmer that is mounted to the side of a lawn tractor. The document does not explain how the spool of whip line on this weed trimmer is repaired or replaced.

U.S. Pat. No. 7,028,455 issued to Violet M. Liguras on Apr. 18, 2006. This document describes a mounting bracket for removably retaining a portable weed trimmer to the side of a lawn tractor. The mounting bracket has a pivot therein so that the weed trimmer can be guided by one hand in a cutting position alongside the tractor by the operator sitting on the lawn tractor. Maintenance of the cutting line is done by taking the weed trimmer altogether out of the mounting bracket and replacing the whip line reel as one would normally do with any portable weed trimmers of that type.

A search of the prior art has also shown weed trimmer heads in which the cutting blades can be replaced when the weed trimmer heads are sitting low on the ground without giving access under the sole plates of the devices. The following four documents explain the structures of these weed trimmer heads.

U.S. Pat. No. 6,119,350 issued to James W. Sutliff et al. on Sep. 19, 2000. This cutting head has replaceable cutting blades that are mounted on pivot pins. The pivot pins are retained fixed to a lower circular plate. An upper plate has holes to register with the upper ends of the pivot pins. Latch members are provided on the upper plate to engaged with the pivot pins. In use, these latch members are held in place by centrifugal force. When the latch members are disengaged, the upper plate may be lifted upward to expose the end of the pivot pins so that the cutting blades can be removed and replaced.

U.S. Pat. No. 7,614,153 issued to Lauro Guerra on Nov. 10, 2009. This document discloses a weed trimmer head wherein the cutting blades are pivoted on pins affixed to a lower shell. An upper shell above the pins keeps the blades captive on the pivot pins. This upper shell is retained to a central housing by the engagement of fingers into corresponding notches. A spring inside the upper shell must be compressed to disengage the fingers from the notches and to expose the pivot pins so that the cutting blades can be replaced.

U.S. Pat. No. 7,878,097 issued to Gordon Strader on Feb. 1, 2011; and US Patent Application 2011/0232109 filed by Gordon Strader and published on Sep. 29, 2011. These two documents describe various aspects of a weed trimmer head wherein the blades are mounted to respective pivot pins extending from a lower shell. A ring plate above the blades and the lower shell retains the blades on the pivot pins. This ring plate has slots in its circumference. The ring can be rotated to align and register the slots over the pivot pins and to provide sufficient clearance to remove the cutting blades from the pins and to replace the cutting blades.

Although the weed trimmers of the prior art that are susceptible of mounting to a lawn tractor deserves undeniable merits, it is believed that these devices contain many movable parts requiring a certain amount of clearance to operate satisfactorily. Because of these clearance, basically, these devices are subject to vibration in use, and accelerated wear due to this vibration. Therefore, it is believed that there is a market need for a sturdier weed trimmer head with less moving parts and less clearance between the parts. It is believed that there is a market demand for a weed trimmer head that is sturdy, easily maintained and more compatible to a mounting to a lawn tractor.

SUMMARY OF THE INVENTION

In the present invention, there is provided a new and improved weed trimmer head in which the cutting blades can be replaced while the lawn tractor on which the weed trimmer head is mounted sits evenly on the ground in a normal position. The elements of the weed trimmer head are held against each other without clearance, in a pre-stressed manner so that vibration amplitude in these elements is reduced.

In one aspect of the present invention, there is provided a weed trimmer head comprising a sole plate having a diameter; a circumference; a plurality of pivot pins extending upwardly therefrom near the circumference. The sole plate also has a driving shaft extending upwardly therefrom from a center thereof. The driving shaft has a threaded segment thereon. A plurality of cutting blades are pivotally mounted to the plurality of pivot pins. A wingnut plate is also provided. This wingnut plate has a disc-like portion and wing blades extending on an upper side thereof. The wingnut plate has a threaded hole in its disc-like portion. The threaded hole is mounted to the threaded segment of the driving shaft and the wingnut plate is movable along the threaded segment for selectively contacting or exposing the ends of the pivot pins.

The cutting blades of the weed trimmer head can be replaced by turning the wingnut plate about the driving shaft using an impact implement or by hand, for distancing the wingnut plate from the pivot pins until sufficient clearance is obtained above the pivot pins for replacing the cutting blades.

In another aspect of the present invention, there is provided a lawn tractor having a lawnmower deck and the above-mentioned weed trimmer head mounted to the lawnmower deck. The lawnmower deck has a bracket and bearing assembly attached to a side thereof and the aforesaid driving shaft of the weed trimmer head is movably mounted to that bracket and bearing assembly. The cutting blades of the weed trimmer head can be replaced while the tractor sits evenly on the ground in a normal position.

In yet a further aspect of the present invention, the weed trimmer head is driven by a separate belt and a belt tightener. The mounting of the weed trimmer on the lawnmower deck is such that the footprint of its core lies within a track width of the lawnmower deck. The weed trimmer and the lawnmower deck can thereby be used independently or together.

The weed trimmer head according to the present invention is susceptible of a low cost of manufacture with regard to both materials and labour and which accordingly is then susceptible of low prices of sale to the consumer, thereby making such mounting joint economically available to the public.

This brief summary has been provided so that the nature of the invention may be understood quickly. A more complete understanding of the invention can be obtained by reference to the following detailed description of the preferred embodiment thereof in connection with the attached drawings.

BRIEF DESCRIPTION OF THE DRAWINGS

A preferred embodiment of the present invention is illustrated in the accompanying drawings, in which like numerals denote like parts throughout the several views, and in which.

DESCRIPTION OF THE PREFERRED EMBODIMENT

Figure 1:
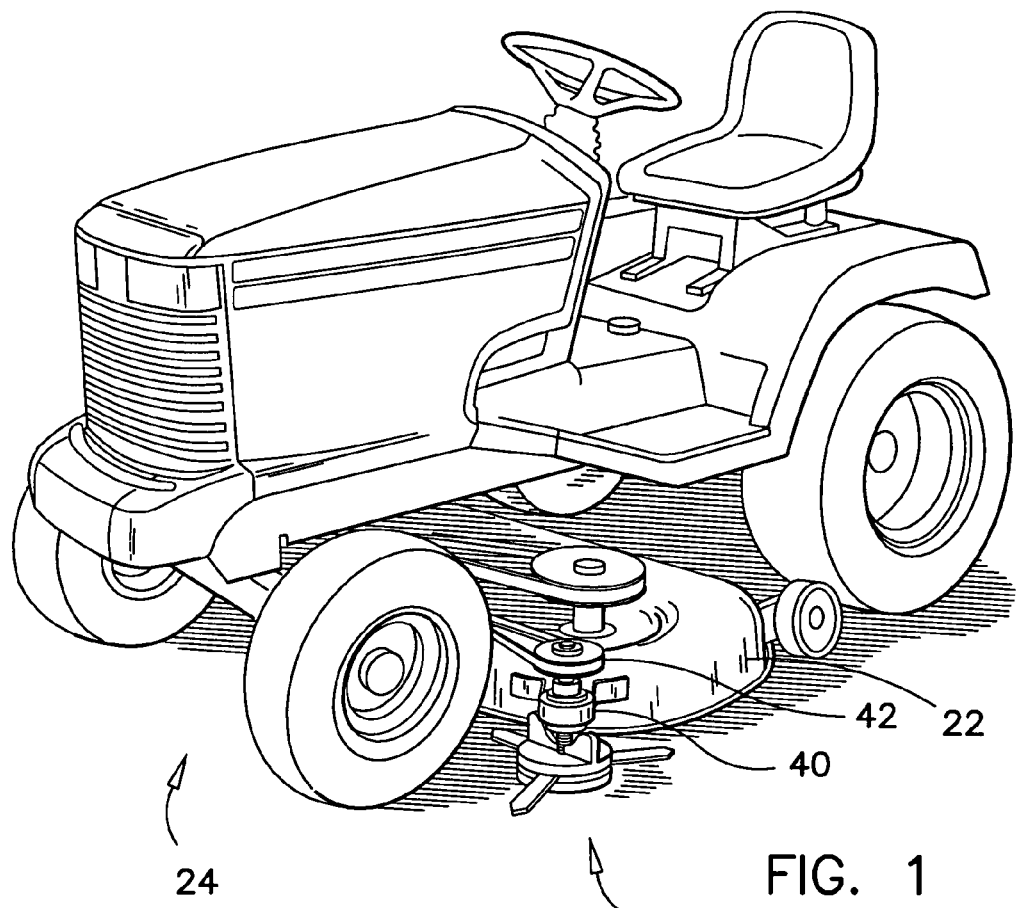
FIG. 1 is a side view of a lawn tractor having the weed trimmer head according to the preferred embodiment of the present invention mounted thereto.
Figure 2:
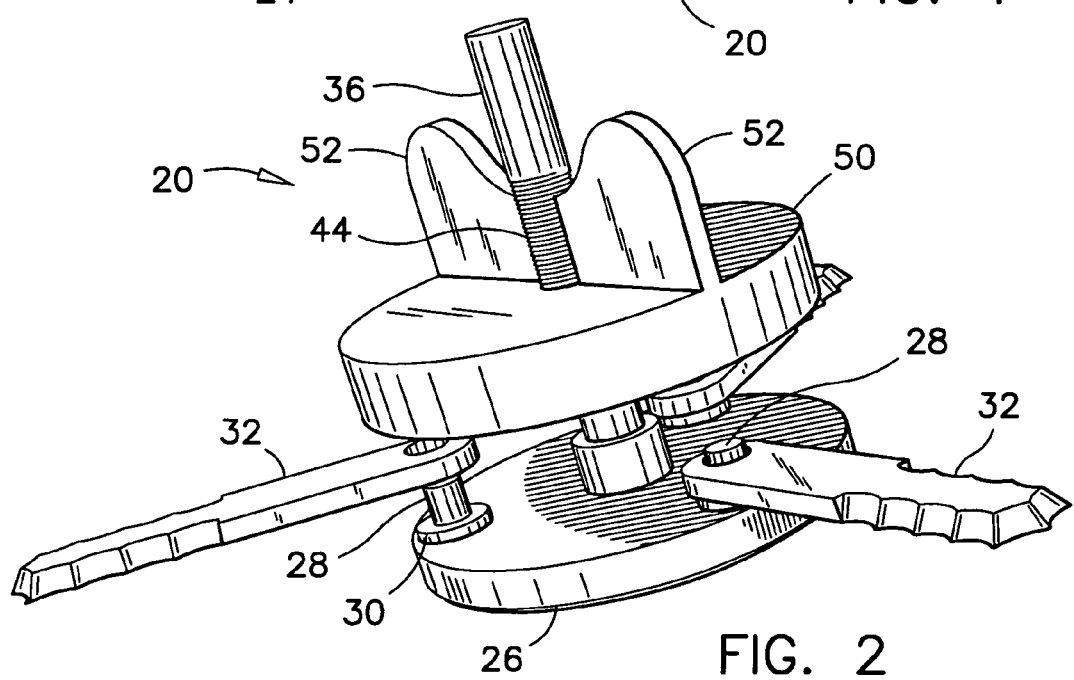
FIG. 2 shows a perspective view of the preferred weed trimmer head shown with the wingnut plate retracted, and one of the cutting blades being removed.

Referring firstly to FIGS. 1 and 2, the preferred weed trimmer head 20 is mounted to the front left side of the mower deck 22 of a lawn tractor 24. A mounting to the right side is also possible.

The weed trimmer head 20 has a sole plate 26 with three pivot pins 28 extending upward from the sole plate 26. Each pivot pin 28 has a shoulder 30 thereon next to the sole plate 26. These shoulders 30 constitute bearing seats on which the cutting blades 32 sit and pivot. Each cutting blade 32 has a hole in its end to pivot freely on one of the pins 28.

The sole plate 26 also has a driving shaft 36 extending upward therefrom. The driving shaft 36 is shown shorter than in reality, for convenience of the drawing. It will be appreciated that the upper end of the driving shaft 36 is movably mounted in a bracket and bearing assembly 40 and it has a pulley 42 mounted to its upper end, as shown in FIG. 1.

The driving shaft 36 has a threaded portion 44 there along and a wingnut plate 50 is threaded to the threaded portion 44. The wingnut plate 50 has disc-like portion that has a similar overall diameter as the sole plate 26, such that it covers the heads of the pivot pins 28.

The wingnut plate 50 has a pair of large wing blades 52 one on each side of the driving shaft 36. Both wing blades 52 jointly extend the full diameter of the wingnut plate 50, and have a substantial thickness to resist impacts by hammer for example for turning the wingnut plate 50 about the driving shaft 36. For example purposes, the wingnut plate 50 is made of steel or aluminum or other strong and resilient material, and the wing blades 52 have a thickness of about one-quarter inch. Because of this structure, the wingnut plate 50 can be easily rotated about the driving shaft 36 by the use of light blows with a striking implement for example.

Figure 3:
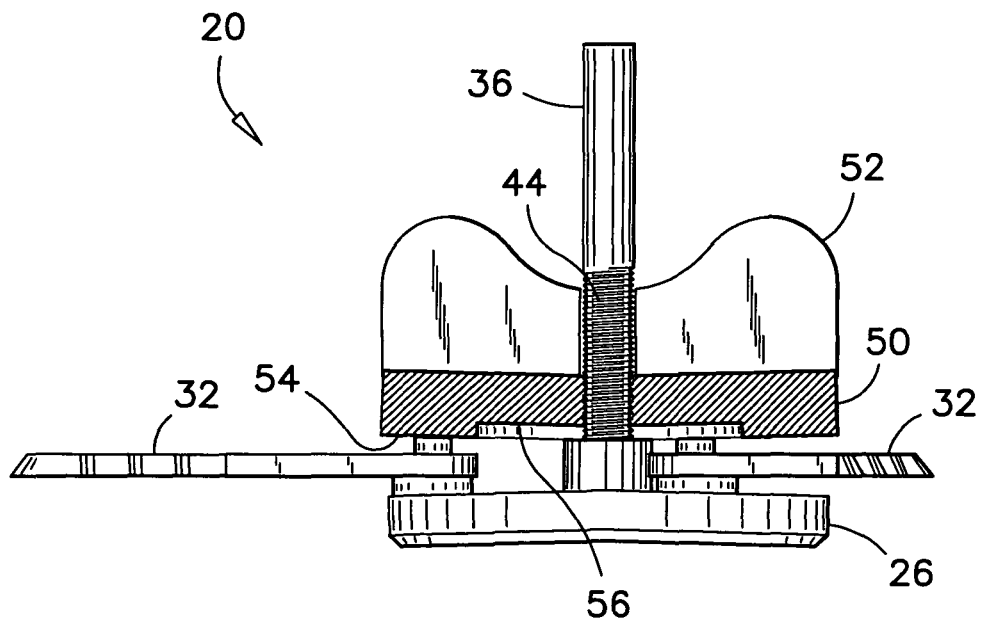
FIG. 3 shows a side view of the preferred weed trimmer head with the wingnut plate shown in cross section and in a down position.
Figure 4:
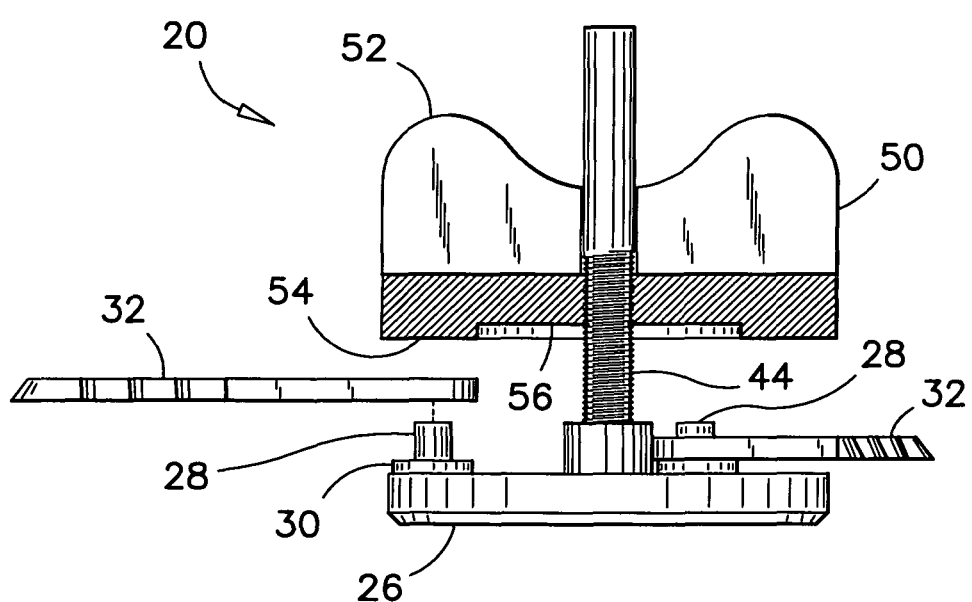
FIG. 4 shows another side view of the preferred weed trimmer head with the wingnut plate shown in cross section and in an upper position with a cutting blade being removed.

Referring now to FIGS. 3 and 4, the preferred trimmer head 20 will be further explained. The wingnut plate 50 has a threaded hole in its center. The wingnut plate 50 is threaded to the threaded portion 44 of the driving shaft 36. The wingnut plate 50 has a downward-facing surface that is made of a raised annular portion 54 along the circumference thereof and a hollow central portion 56.

In operation, the wingnut plate 50 is turned on the threaded portion 44 of the driving shaft 36 until its raised annular portion 54 is held tight against the head ends of the pivot pins 28. In that position, the cutting blades 32 are held captive about their respective pivot pins 28. The pivot pins 28 are long enough to provide a loose running fit between the wingnut plate 50 and the shoulder 30.

The hollow central portion 56 is provided in the central underside portion of the wingnut plate 50 so that tightening of the wingnut plate 50 beyond a contact with the head ends of the pivot pins 28 causes a slight downward deflection along the diameter of the wingnut plate 50 as illustrated in an exaggerated manner in FIG. 3.

Because the sole plate 26 has a uniform thickness, an excessive stress along the driving shaft 36, such as by the over-tightening of the wingnut plate 50 as explained above, causes this sole plate 26 to bow slightly upward also as illustrated in an exaggerated manner in FIG. 3. The deflections in each of the wingnut plate 50 and in the sole plate 26 cause a pre-stressing of the elements of the weed trimmer head 20 to reduce the amplitude of any vibration that might occur in the weed trimmer head 20 during use.

Such vibration might be caused by an unbalance or by a natural frequency of any element of the weed trimmer head 20 at or near the rotational speed of the weed trimmer head. By keeping the elements under a pre-stressed manner as described above reduces the amplitude of vibration or dampens the amplitude of a vibration that might occur. Such a reduction of vibration is beneficial for reducing wear on all parts of the weed trimmer head 20.

This pre-stressing of the weed trimmer head 20 is also beneficial for locking the parts in place against relative movement during use. This is considered as a major improvement over the weed trimmer heads of the prior art having moving parts therein and clearances between these moving parts.

As it can be seen in FIG. 4, the cutting blades 32 can easily be replaced when the wingnut plate 50 is moved upward along the driving shaft 36. The cutting blades 32 can be replaced without having to tilt or to otherwise raise the weed trimmer head 20 up from the ground.

Figure 5:
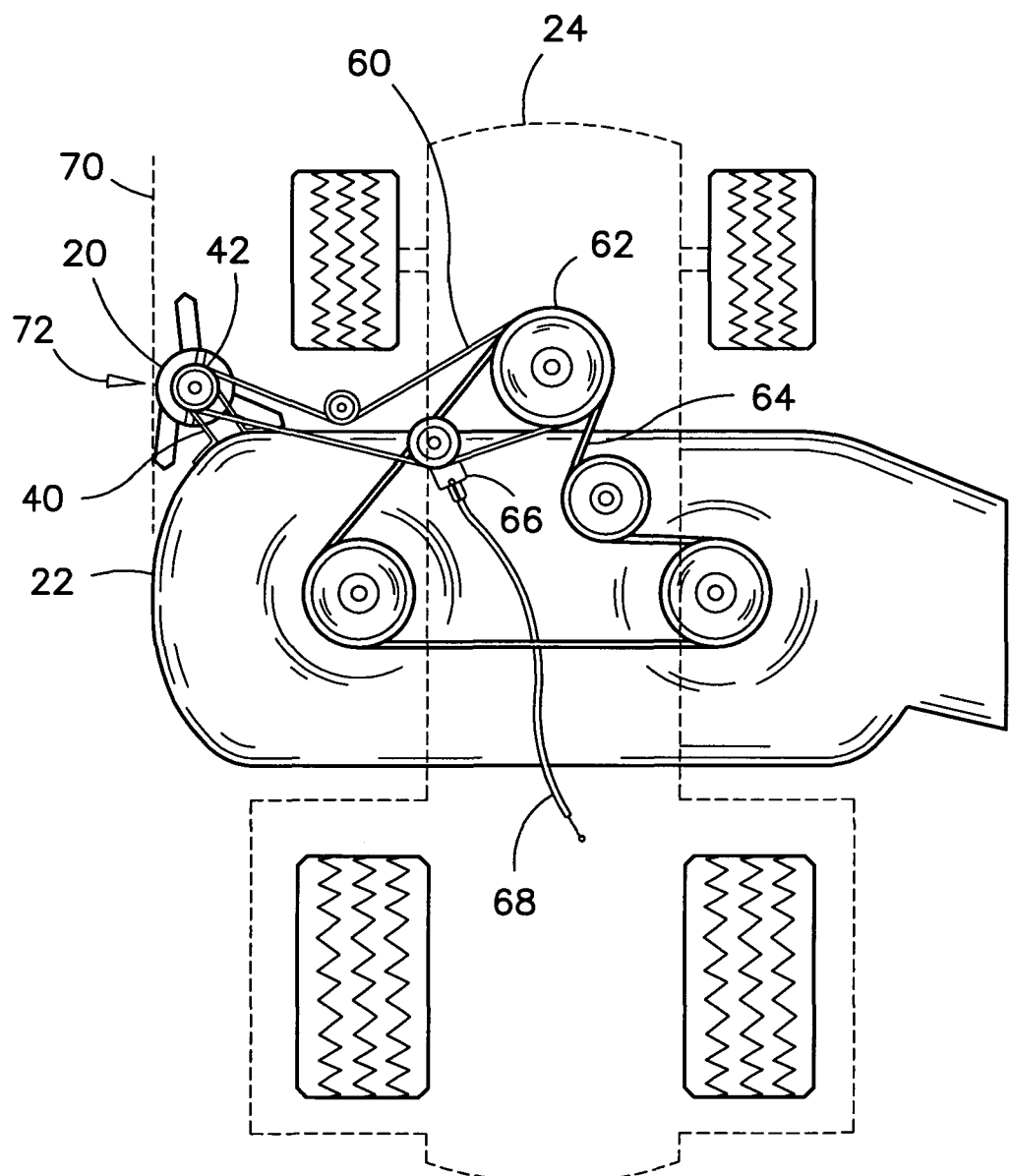
FIG. 5 illustrates a plan view of the belt arrangement driving the lawn mover deck and the preferred weed trimmer head.

Referring now to FIG. 5 the weed trimmer head is permanently fastened to the mower deck 22 by means of a bracket and bearing assembly 40. A pulley or sheave 42 is mounted to the end of the driving shaft 36 as mentioned earlier. This sheave 42 is driven by a belt 60 which is threaded on the double-groove power-take-off sheave 62 of the tractor. Of course, the other groove on the output sheave 62 drives another belt 64 to the lawnmower deck 22.

The tension in the belt 60 driving the weed trimmer head 20 is controlled by a belt tightener assembly 66. This belt tightener assembly 66 has a pull cable system 68 connected to it such that the tension of the belt 60 can be controlled from the tractor's dashboard by the tractor operator, to engage or to disengage a rotation of the weed trimmer head 20.

The use of a double-groove sheave 62, a separate belt 60 and belt tightener assembly 66 allows for the weed trimmer head 20 to be operated independently or at the same time as the lawnmower deck 22. Similarly, the lawnmower deck 22 may be operated independently or at the same time as the weed trimmer head 20. The clutch system on the lawnmower deck 22 has not been illustrated because these mechanisms are well known in this field and are not the focus of the present invention.

In order to facilitate the use of the preferred weed trimmer 20 or the lawnmower deck 22 in an independent manner, the bearing assembly 40 is mounted at a location on the lawnmower deck 22 that places the core of the weed trimmer 20, that is the sole plate 26 and the wingnut plate 50, within a track width of the lawnmower deck 22. The track width of the lawnmower deck 22 is illustrated by dashed line 70 in FIG. 5 extending tangent to the lawnmower deck 22. The footprint of the weed trimmer 20 inside this track width 70 is illustrated by label 72.

When the lawnmower deck 22 is used independently, the blade 32 extending to the left of the weed trimmer 20 folds backward and rests within the track width 70 of the lawnmower deck 22 as it may be understood from FIG. 5.

What is claimed is:

1. A weed trimmer head comprising;
a driving shaft having a first end; a second end and a threaded portion along an intermediate segment thereof between said first end and said second end; said first end having a bearing assembly and a power driving element mounted thereto for driving a rotation thereof by rotation of said power driving element, and said second end having a sole plate connected thereto and a power transmission connection connecting said sole plate to said driving shaft for driving a rotation of said sole plate by said rotation of said driving shaft and said power driving element;
said sole plate having a diameter; a circumference; a plurality of pivot pins extending therefrom near said circumference; each of said pivot pins having a large end connected to said sole plate and a small end extending away from said sole plate parallel with said driving shaft, toward said first end of said driving shaft;
a plurality of cutting blades pivotally mounted to said plurality of pivot pins each of said cutting blades having a thickness;
a wingnut plate mounted to said driving shaft; said wingnut plate having a disc-like portion; a flat surface facing said small ends of said pivot pins, and wing blades extending from an outside surface thereof toward said power driving element, opposite from said flat surface; said wingnut plate having a threaded hole in said disc-like portion; said threaded hole being mounted to said threaded portion of said driving shaft; such that said wingnut plate is movable along said threaded portion of said driving shaft, by rotation of said wingnut plate about said driving shaft, relative to said sole plate; said threaded portion of said driving shaft having a sufficient length such that said wingnut plate is movable toward and away from said sole plate and said small ends of said pivot pins by way of said threaded hole and said threaded portion a distance that is greater than said thickness of one of said cutting blades for selectively contacting said small ends of said pivot pins for retaining said cutting blades to said pivot pins, or for exposing said small ends of said pivot pins for replacing one of said cutting blades from one of said pivot pins.

2. The weed trimmer head as claimed in claim 1, wherein said wing blades jointly extend along a full diameter of said wingnut plate.

3. The weed trimmer head as claimed in claim 2, wherein said wing blades have a thickness of about one-quarter inch.

4. The weed trimmer head as claimed in claim 3, wherein said wingnut plate is made of metal.

5. The weed trimmer head as claimed in claim 1, wherein said wingnut plate has a raised annular portion and a hollow central portion.

6. The weed trimmer head as claimed in claim 1, wherein each said pivot pins has a shoulder at said large end and a bearing surface on said shoulder.

7. The weed trimmer head as claimed in claim 1, wherein a diameter of said wingnut plate is similar to said diameter of said sole plate.

8. The weed trimmer head as claimed in claim 5, wherein said sole plate has a uniform thickness.

9. The weed trimmer head as claimed in claim 8, wherein said sole plate and said wingnut plate are made of a resilient material.

10. The weed trimmer head as claimed in claim 9, wherein said wingnut plate and said sole plate are slightly bowed toward each other.

11. A lawnmower deck and a weed trimmer head mounted to said lawnmower deck; said weed trimmer head comprising;
a driving shaft having a first end; a second end and a threaded portion along an intermediate segment thereof between said first end and said second end; said first end having a bearing assembly and a power driving element mounted thereto for driving a rotation thereof by rotation of said power driving element, and said second end having a sole plate connected thereto and a power transmission connection connecting said sole plate to said driving shaft for driving a rotation of said sole plate by said rotation of said driving shaft and said power driving element;

said sole plate having a diameter; a circumference; a plurality of pivot pins extending therefrom near said circumference; each of said pivot pins having a large end connected to said sole plate and a small end extending away from said sole plate parallel with said driving shaft, toward said first end of said driving shaft;

a plurality of cutting blades pivotally mounted to said plurality of pivot pins each of said cutting blades having a thickness;

a wingnut plate mounted to said driving shaft; said wingnut plate having a disc-like portion; a flat surface facing said small ends of said pivot pins, and wing blades extending from an outside surface thereof toward said power driving element, opposite from said flat surface; said wingnut plate having a threaded hole in said disc-like portion; said threaded hole being mounted to said threaded portion of said driving shaft such that said wingnut plate is movable along said threaded portion of said driving shaft by rotation of said wingnut plate about said driving shaft, relative to said sole plate; said threaded portion having a sufficient length such that said wingnut plate is movable toward and away from said sole plate and said small ends of said pivot pins by way of said threaded hole and said threaded portion, a distance that is greater than said thickness of one of said cutting blades for selectively contacting said small ends of said pivot pins for retaining said cutting blades to said pivot pins, or for exposing said small ends of said pivot pins for replacing one of said cutting blades from one of said pivot pins; and said wing blades being made of stiff material such that said wingnut plate and said sole plate can be made to bow toward each other by force on said wing blades.

12. The lawnmower deck as claimed in claim 11, wherein said wing blades jointly extend along a full diameter of said wingnut plate.

13. The lawnmower deck as claimed in claim 11, wherein said flat surface has a raised annular portion and a hollow central portion.

14. The combination lawnmower deck as claimed in claim 13, wherein a diameter of said wingnut plate is similar to said diameter of said sole plate.

15. The combination lawnmower deck as claimed in claim 14, wherein said sole plate and said wingnut plate are made of a resilient material.

16. A lawn tractor having a lawnmower deck and a weed trimmer head mounted to said lawnmower deck; said weed trimmer head comprising;

a driving shaft having a first end; a second end and a threaded portion along an intermediate segment thereof between said first end and said second end; said first end having a bearing assembly and a power driving element mounted thereto for driving a rotation thereof by rotation of said power driving element, and said second end having a sole plate connected thereto and a power transmission connection connecting said sole plate to said driving shaft for driving a rotation of said sole plate by said rotation of said driving shaft and said power driving element;

said sole plate having a diameter; a circumference; a plurality of pivot pins extending therefrom near said circumference; each of said pivot pins having a large end connected to said sole plate and a small end extending away from said sole plate parallel with said driving shaft, toward said first end of said driving shaft;

a plurality of cutting blades pivotally mounted to said plurality of pivot pins each of said cutting blades having a thickness;

a wingnut plate mounted to said driving shaft; said wingnut plate having a disc-like portion; a flat surface facing said small ends of said pivot pins, and wing blades extending from an outside surface thereof toward said power driving element, opposite from said flat surface; said wingnut plate having a threaded hole in said disc-like portion; said threaded hole being mounted to said threaded portion of said driving shaft such that said wingnut plate is movable along said threaded portion of said driving shaft by rotation of said wingnut plate about said driving shaft, relative to said sole plate; said threaded portion having a sufficient length such that said wingnut plate is movable toward and away from said sole plate and said small ends of said pivot pins by way of said threaded hole and said threaded portion, a distance that is greater than said thickness of one of said cutting blades for selectively contacting said small ends of said pivot pins for retaining said cutting blades to said pivot pins, or for exposing said small ends of said pivot pins for replacing one of said cutting blades from one of said pivot pins; and said wing blades extending upwardly relative to said lawnmower deck such that said wingnut plate is workable from a close proximity of said driving element relative to said sole plate, and said cutting blades are replaceable, without tilting said lawn tractor.

17. The lawn tractor as claimed in claim 16, further having a double-groove power-take-off sheave and belts engaged over said double-groove power-take-off sheave for driving said lawnmower deck and said weed trimmer head.

18. The lawn tractor as claimed in claim 16, further comprising a belt tightener mounted thereto along one of said belts for selectively engaging a rotation of said weed trimmer head.

19. The lawn tractor as claimed in claim 16, wherein said lawnmower deck has a track width and said weed trimmer head has a footprint, and said footprint is within said track width.

20. The lawn tractor as claimed in claim 16, wherein said wingnut plate and said sole plate are made of resilient material and are slightly bowed toward each other.

* * * * *